(12) United States Patent
Kalthof et al.

(10) Patent No.: US 7,968,027 B2
(45) Date of Patent: Jun. 28, 2011

(54) METHOD FOR PRODUCING PLASTIC RODS

(75) Inventors: Bernfried Kalthof, Kleinwallstadt (DE); Holger Lorenz, Kleinheubach (DE); Satilmis Yilmaz, Klingenberg (DE)

(73) Assignee: Evonik Roehm GmbH, Darmstadt (DE)

( * ) Notice: Subject to any disclaimer, the term of this patent is extended or adjusted under 35 U.S.C. 154(b) by 1013 days.

(21) Appl. No.: 10/585,932

(22) PCT Filed: Jan. 13, 2005

(86) PCT No.: PCT/EP2005/000266
§ 371 (c)(1),
(2), (4) Date: Jul. 13, 2006

(87) PCT Pub. No.: WO2005/097463
PCT Pub. Date: Oct. 20, 2005

(65) Prior Publication Data
US 2007/0108669 A1 May 17, 2007

(30) Foreign Application Priority Data
Mar. 25, 2004 (DE) .......................... 10 2004 015 072

(51) Int. Cl.
*B29C 47/06* (2006.01)
(52) U.S. Cl. ................................. 264/173.16
(58) Field of Classification Search ............. 264/171.23, 264/171.12
See application file for complete search history.

(56) References Cited

U.S. PATENT DOCUMENTS

| 3,229,005 A | | 1/1966 | Reifenhauser |
| 4,288,905 A | * | 9/1981 | Kessler ............... 29/525.09 |
| 4,943,463 A | * | 7/1990 | Back .................... 428/44 |
| 6,533,564 B1 | | 3/2003 | Haas et al. |

FOREIGN PATENT DOCUMENTS

| GB | 1 273 706 | 5/1972 |
| WO | 02 092321 | 11/2002 |

OTHER PUBLICATIONS

Harper, Charles A. Handbook of Plastics, Elastomers & Composites (4th Edition).. McGraw-Hill. p. 49 Online version available at: http://knovel.com/web/portal/browse/display?_EXT_KNOVEL_DISPLAY_bookid=1627&VerticalID=0.*
Office Action Issued Jan. 11, 2011 in Canadian Application No. 2,557,257.

* cited by examiner

*Primary Examiner* — Christina Johnson
*Assistant Examiner* — Galen Hauth
(74) *Attorney, Agent, or Firm* — Oblon, Spivak, McClelland, Maier & Neustadt, L.L.P.

(57) ABSTRACT

The invention relates to a method for extruding round rods from transparent plastics such as for example polymethylmethacrylate (PMMA), polycarbonate (PC) or polyethylene (PET) and to a method for producing said round rods.

5 Claims, 1 Drawing Sheet

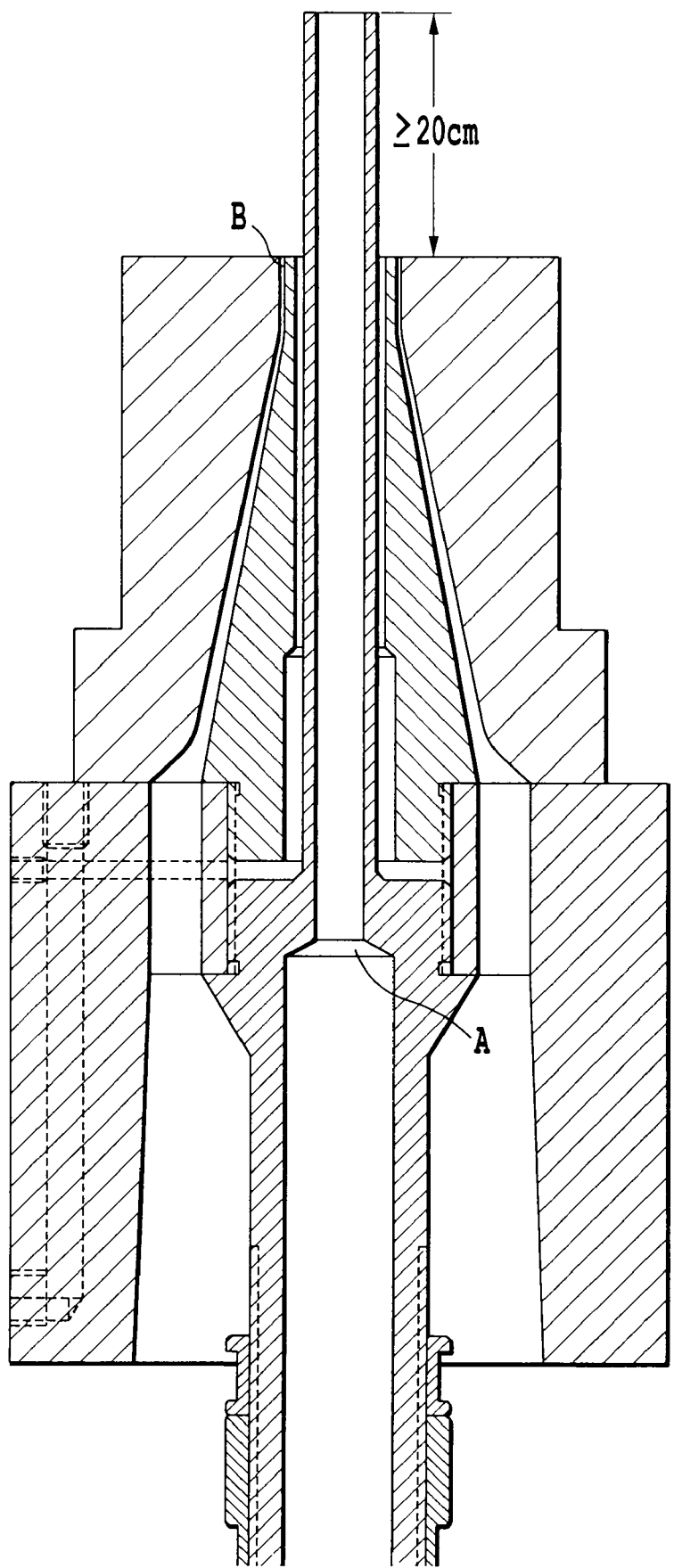

METHOD FOR PRODUCING PLASTIC RODS

The invention relates to a process for extrusion of round rods composed of transparent plastics, such as polymethyl methacrylate (PMMA), polycarbonate (PC), or (PET) polyethylene.

Round rods composed of Plexiglas® are known, and are marketed by Röhm GmbH & Co. KG.

The production of these rods can be regarded as complicated, depending on requirements. In known methods, a flat sheet composed of PMMA is first produced, and is divided into pieces to give square rods. The square rods are then subjected to mechanical working (turning and polishing). This process is labor-intensive and therefore of no great commercial interest, especially since it also generates a corresponding amount of waste. The price level for round rods of this type is relatively high. Another process consists in the casting of rods, but this is likewise complicated and of rather low commercial significance.

Good-quality round rods with relatively small diameters can be obtained via extrusion of a PMMA molding composition, such as Plexiglas® 7H.

However, the technology of this process makes it difficult for rods from about D=25 mm, because since a large amount of thermal energy has to be dissipated from the extruded rod via cooling, adequate dimensional stability cannot be achieved until some time has elapsed, and a resultant disadvantage is that flexing can occur. This effect can be countered by applying suitable cooling sections, e.g. cooling air, in combination with support rollers.

However, both of these measures are disadvantageous because the rod collapses under its own weight, leading to markedly discernible diameter differences—the rod is not round. There can also be an adverse effect on surface transparency, the surface of the rod appearing cloudy.

Reduction in extrusion speed with the aim of creating improved cooling conditions for the rod reduces manufacturing costs to values which are then commercially unacceptable.

EP 1 291 160 (Fiberstars) describes the continuous coextrusion of polymeric optical fibers by first extruding a thin coating and then extruding the core of the polymeric optical fiber from a crosslinkable polymer. The thin coating composed of a fluorine-containing polymer.

In conventional extrusion processes, deformation of the rods occurs as a consequence of their own weight as soon as rods with relatively large diameters are produced.

It was therefore an object to provide a process for production of round rods with relatively large diameters.

The object was achieved via a process for production of rods composed of transparent plastics via extrusion of a plastics molding composition, characterized in that an extruded plastics molding composition is divided and plastics molding composition 1 is used to extrude a plastics tube, and the previously separated molten plastics molding composition 2 is used in parallel to fill the freshly extruded tube, about 20 cm after entry into a vacuum tank calibrator, and the newly formed plastics molding is further processed as in conventional tube extrusion. A feature of the process is that, by means of support air and subatmospheric pressure during the calibration process, the plastics molding composition 2 can be inserted into the plastics tube produced with the plastics molding composition 1.

Surprisingly, it has been found that the inventive process can produce round rods with large diameters with excellent optical quality and with particularly uniform cross section. There is no need for complicated downstream machining steps. The inventive process can produce round rods with diameters of any desired size. It is preferable to produce round rods whose diameters are up to 200 mm, particularly preferably up to 80 mm. However, all sizes of diameter are possible, depending on the capacity of the extruder.

The invention therefore also includes the round rods which can be produced by the inventive process.

Round rods produced by conventional processes having relatively large diameter mostly have a matt surface. It has been found that the round rods produced by the inventive process have particularly good optical properties. Surprisingly, it has been found that the inventive round rods are highly transparent. The inventive process produces streak-free round rods whose light transmittance is greater when compared with that of round rods manufactured conventionally. The inventively produced round rod is more effective than conventionally produced round rods in transporting visible light. Surprisingly, it has been found that the inventive round rods have particularly uniform cross sections. The values obtained on measurement of the roundness of the inventive round rods are excellent. The inventive process can produce round rods from a very wide variety of plastics. It is preferable to use polymethyl methacrylate, polycarbonate, or polyethylene, particularly preferably polymethyl methacrylate.

Surprisingly, it has been found that the inventive process can produce plastics rods from uncolored polymethyl methacrylate whose transmittance is above $T_{D65}$ 85%.

The invention also provides an apparatus for production of the inventive round rods.

The apparatus is characterized in that an extruded round rod of relatively small diameter in an inner extrusion die A in parallel with an extruded tube of relatively large diameter using an outer extrusion die B are introduced without contact, after discharge from the extruder, in a calibrator where they fuse to one another after about 20 cm, and it is preferable that the extruded tube here is cooled with stabilization of shape prior to the fusion to the round rod. The ratio of the diameter of the plastics rod produced from the plastics composition 2 to that of the plastics tube produced from the plastics composition 1 can be as desired. A rod:tube ratio of 1:2 is preferred. The rod:tube ratio is ideally from 6:20 to 45:50, very particularly preferably 9:20, 20:40, or 22:50.

The ratio of the length of the path of the plastics composition 1 (of the plastics tube) prior to cooling with the plastics composition 2 (of the rod) to the diameter of the plastics rube is variable, and depends on throughput and surface quality.

Extruders are used to provide the plastics melt and are selected appropriately as a function of processing temperature, type of plastic, or throughput. A wide variety of extruders is available to the person skilled in the art, examples being: single-screw extruders, vented extruders, cascade extruders or tandem extruders, high-speed extruders, planetary-gear extruders, twin-screw extruders, ram extruders.

The downstream vacuum tank calibrator is used as heat-conditioning section (full-immersion water bath and/or blower air).

The FIGURE shows the inventive apparatus used to extrude tube and rod.

The melt is extruded through the gap to give a tube. The inner die molds the melt to give a rod which, after entry into the vacuum tank calibrator after about 20 cm fills the extruded tube. The plastics tube and, after a time delay, the extruded complete rod, are heat-conditioned in the vacuum tank calibrator in such a way as to achieve adequate dimensional stability. The inventive rod is then slowly cooled. It can be further processed by conventional processing methods.

It possible to produce clear colorless or colored rods. It is also possible to produce round rods whose plastics composition 1 has been colored while the plastics composition 2 is not colored or is differently colored, or in which the plastics composition 1 is not colored, while the plastics composition 2 is colored.

The inventively produced rods are used in the fitting-out of exhibition stands and of shops (e.g. as decorative elements), in construction work (e.g. stair railings or stair supports), in the lighting industry (e.g. as lighting unit), in the furniture industry (e.g. table legs or chair legs), or in advertising technology.

The examples given below are given for more detailed illustration of the present invention but are not intended to restrict the invention to the features disclosed herein.

EXAMPLES

Inventive Example 1

Uncolored polymethyl methacrylate pellets are melted in a single-screw extruder. A tube whose diameter is 50 mm is extruded by way of the inventive apparatus. 20 cm after entry into a vacuum tank calibrator, the freshly extruded tube is filled in parallel with the plastics composition of the rod. The rod is slowly cooled. The material is cut to size to give cylindrical test specimens whose length is 180 mm. The face sides which are perpendicular to the axis of the cylinder are polished manually on a polishing belt.

Specimen E1

Comparative Example 1

2 cylindrical test specimens whose length is 180 mm are produced from square rods composed of uncolored polymethyl methacrylate. A cylindrical test specimen of diameter 60 mm (C1) and a test specimen of diameter 80 mm (C2) are produced. The face sides perpendicular to the axis of the cylinder are polished as described in inventive example 1.

Specimens C1 and C2

Inventive Example 3

A transmittance spectrum in the wavelength range from 380 nm to 780 nm is measured to DIN 5036, using an integration sphere. Each of the measurements was made in both directions of transmission. Averages are given calculated from 4 spectra, 2 in each of the directions of transmission. The range of variation within the 4 measurements was +/−0.3%.

The results are collated in the table below:

TABLE 1

| Light transmittance for standard D65 standard illuminant | |
| --- | --- |
| Specimen | $\tau_{D65}$ [%] |
| E1 | 86.3 |
| C1 | 83.3 |
| C2 | 84.2 |

Inventive Example 4

Light from a HeNe laser is passed along the axis of the cylinder of the specimens. A photograph is taken perpendicularly thereto.

The more inhomogeneous the material, e.g. as a consequence of contamination or density fluctuations, the brighter is its appearance in this arrangement, because of light scattering.

Specimen E1 exhibits the lowest level of light scattering.

The roundness of the inventively produced round rod (specimen E1) was also studied. For this, the diameter was measured at 5 different cross-sectional points. The table below collates the results.

TABLE 2

| Roundness of a round rod whose intended diameter is 50 mm | | | | | |
| --- | --- | --- | --- | --- | --- |
| | Measurement No. | | | | |
| | 1 | 2 | 3 | 4 | 5 |
| Diameter [mm] | 50.60 | 50.30 | 50.00 | 49.70 | 49.40 |

Inventive Example 5

As in inventive example 1, a tube whose diameter is 40 mm is extruded. 20 cm after entry into a vacuum tank calibrator, the freshly extruded tube is filled in parallel with the plastics composition of the rod. The rod is slowly cooled. The material is cut to size to give cylindrical test specimens whose length is 180 mm.

The face sides which are perpendicular to the axis of the cylinder are polished manually on a polishing belt.

Specimen E2

The roundness of the inventively produced round rod (specimen E2) was studied. For this, the diameter was measured at 5 different cross-sectional points. The table below collates the results.

TABLE 2

| Roundness of a round rod whose intended diameter is 40 mm | | | | | |
| --- | --- | --- | --- | --- | --- |
| | Measurement No. | | | | |
| | 1 | 2 | 3 | 4 | 5 |
| Diameter [mm] | 39.85 | 39.60 | 40.05 | 39.65 | 40.00 |

What is claimed is:

1. A process for producing a rod composed of a transparent plastic via extrusion of a plastic molding composition, wherein the process comprises:

dividing the plastic molding composition into a plastic molding composition 1 and a plastic molding composition 2;

extruding the plastic molding composition 1 as a plastic tube; and extruding the plastic molding composition 2 as a plastic rod, wherein the plastic tube and the plastic rod are discharged from the extruder and then introduced without contact with one another into a vacuum tank calibrator, wherein the plastic tube is heat conditioned in the vacuum tank calibrator so as to achieve dimensional stability, and wherein at about 20 cm after entry into the vacuum tank calibrator the plastic tube is filled in parallel with the plastic rod and fused together.

2. The process as claimed in claim 1, wherein the rod is composed of an uncolored polymethyl methacrylate having a transmittance of at least $\tau_{D65}$ 85%.

3. The process as claimed in claim 1, wherein the plastic molding composition is colored.

4. The process as claimed in claim 1, wherein the rod is heat conditioned in the vacuum tank calibrator so as to achieve dimenstional stability and then slowly cooled.

5. The process as claimed in claim 1, wherein the rod is heat conditioned in the vacuum tank calibrator so as to achieve dimensional stability and then slowly cooled, and wherein the rod exhibits a uniform diameter when measured at a number of different cross-sectional points along the rod.

* * * * *